(12) United States Patent
Petkov

(10) Patent No.: US 8,058,851 B2
(45) Date of Patent: Nov. 15, 2011

(54) GENERATOR CONTROL UNIT WITH FAST FIELD DISCHARGE

(75) Inventor: Plamen Petkov, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 708 days.

(21) Appl. No.: 12/233,545

(22) Filed: Sep. 18, 2008

(65) Prior Publication Data

US 2010/0066314 A1 Mar. 18, 2010

(51) Int. Cl.
*H02P 9/10* (2006.01)
*H02P 9/14* (2006.01)
(52) U.S. Cl. ............... 322/68; 322/44; 361/64
(58) Field of Classification Search ............ 322/44, 322/68; 361/64
See application file for complete search history.

(56) References Cited

U.S. PATENT DOCUMENTS

| | | | |
|---|---|---|---|
| 4,103,217 A | 7/1978 | Auinger et al. ............... | 322/28 |
| 4,455,585 A | 6/1984 | Murari et al. ............... | 361/18 |
| 5,850,138 A | 12/1998 | Adams et al. ............... | 322/68 |
| 6,031,701 A | 2/2000 | Maeckel et al. ............... | 361/52 |
| 6,191,562 B1 | 2/2001 | Mueller et al. ............... | 322/59 |
| 6,262,558 B1 * | 7/2001 | Weinberg ............... | 320/101 |
| 6,819,537 B2 * | 11/2004 | Pohlman et al. ............... | 361/64 |
| 2003/0015996 A1 * | 1/2003 | Pohlman et al. ............... | 323/225 |
| 2008/0043393 A1 * | 2/2008 | Petkov ............... | 361/103 |
| 2010/0007312 A1 * | 1/2010 | Petkov ............... | 322/44 |

\* cited by examiner

*Primary Examiner* — Pedro J Cuevas
(74) *Attorney, Agent, or Firm* — Miriam Jackson, Esq.

(57) ABSTRACT

A generator control unit for fast field discharge of a field coil is disclosed. The generator control unit comprises a control domain for detecting an excessive generator output voltage, a buck regulator with a feedback pin fed from the control domain, and an over-voltage protection switch connected in a field coil return path which is bypassed by a voltage limiting device. The control domain receives a point of regulation voltage feedback and upon detection of an over-voltage, emits a disable signal to cause the buck switch shut off along with the over-voltage protection switch. Thus dual breaking points are created at two ends of the field coil to dissipate the field charge quickly through the voltage limiting device. When the buck switch experiences a shorting failure, the over-voltage protection switch provides a second breaking point to allow the field discharge through the voltage limiting device, thereby controlling the field discharge with directly controlled over-voltage protection switch.

20 Claims, 5 Drawing Sheets

GENERATOR CONTROL UNIT WITH FAST FIELD DISCHARGE

BACKGROUND OF THE INVENTION

The present invention generally relates to generator overvoltage protective circuits and, more specifically, to generator control unit circuits having a directly controlled switch for fast field discharge.

There are various known control circuits for dissipating the field energy of a field winding of a generator in an overvoltage condition. FIG. 3 shows a circuit 100 of known prior art for discharging the field current. A fast field discharge circuit 102 includes an additional switch 104 in series with a fly-wheeling diode 106. The additional switch 104 is normally kept closed and is opened upon detection of an overvoltage. An RC snubber is also used across the switch 104 to protect it from excessive inductive kick. An isolation switch 108 is used to address the effect of a shorting failure of main buck switch 110. Both the isolation switch 108 and the additional switch 104 of the fast field discharge circuit 102 are floating and require expensive isolated gate drivers with respective floating power supplies.

Referring to FIG. 4, U.S. Pat. No. 4,455,585 describes a control circuit 150 having an excitation winding L of an alternator connected in series with a controlled electronic switch 152, and an electronic regulator 154 connected to the electronic switch 152 for controlling the opening of electronic switch 152 when an output voltage of the generator exceeds a predetermined value. A regulator circuit 154 is fed by an output of the generator output and has an input IN connected to the intermediate terminal of a voltage divider consisting of two resistors R1 and R2 which are connected between the terminals 156 and 158. The control unit 150 further comprising a protective device connected in parallel to the excitation winding L and comprising a semiconductor circuit 160. An electronic switch 162 operated by an additional output US of the regulator 154 is in parallel with the semiconductor circuit 160 so that it is closed during the normal operation of the generator and opens when an overvoltage occurs on the generator output. The circuit is provided with more than one electronic power switch which increases the number of components constituting the control device, leading to complexity of the circuit and cost increase.

Referring to FIG. 5, U.S. Pat. No. 6,191,562 relates to a circuit configuration 200 for discharge of field energy. The circuit 200 includes a generator G with a field winding 202 characterized by its inductor L and its ohmic resistor R. The energy quenching of field winding 202 is controlled by a power transistor T which in normal operation, is operated with timed pulses from a clock control 204. The field winding 202 and power transistor T are connected in series to a battery voltage Ubatt and a power switch S in series with a diode $D_1$ form a free-running circuit of the field winding 202. The circuit configuration 200 further includes a diode $D_2$ and a zener diode $D_Z$ that are arranged between field winding 202 and power transistor T in such a way that, when the power switch S is opened, current can flow from field winding 202 via diode $D_2$ and zener diode $D_Z$ to the control connection of power transistor T. When the battery is not completely cut off or a connection failure occurs anywhere in a power feeding cable, comparatively small surges of voltage are repeatedly applied to the power zener diode $D_Z$ irregularly within a short period. In this case, a large amount of heat accumulates due to the repetitive generation of heat, even though in comparatively small amounts. Therefore thermal damage becomes larger in this case than in the case where large surge of voltage generated when a rated load is cut off or disconnected. Moreover, the increased complexity of the circuit is undesirable.

As can be seen, there is a need for a simple and reliable control circuit having inexpensive power regulators that can quickly dissipate the field energy without causing any damage to equipment supplied by the generator. Such a control circuit would be safe and dissipate the field energy without generating considerable heat stress in the system. Further, such a needed circuit would associate a directly controlled regulator for convenience and would operate on the buck regulator shorting failure conditions.

SUMMARY OF THE INVENTION

In one aspect of the present invention, a generator control unit comprises a control domain for detecting an over-voltage of a generator, and a buck switch with a feedback pin fed from the control domain, an over-voltage protection switch connected in a field coil return path which shuts off with the buck switch when an over-voltage is sensed and functioning as a directly controlled switch to protect against the effect of a shorting failure of the buck switch, and a voltage limiting device across the over-voltage protection switch responsive for immediate field discharge upon shut off of the over-voltage protection switch.

In another aspect of the present invention, a method for discharging of field energy of a field coil of a generator comprises detecting a generator over-voltage by a control domain, emitting an error signal to a buck switch which shuts off the buck switch and shuts off an over-voltage protection switch, dissipating field energy rapidly through a voltage limiting device, and allowing field discharge through the voltage limiting device when the buck switch experiences a shorting failure.

In a further aspect of the present invention, an apparatus for discharge of field energy of a field coil of a generator comprises a control domain for detecting an excessive output voltage of a generator, a buck switch having a feedback pin fed from the control domain, an over-voltage protection switch connected in a field coil return path which shuts off with the buck switch when an over-voltage is sensed and functioning as a directly controlled switch to protect against the effect of a shorting failure of the buck switch, and a voltage limiting device across the over-voltage protection switch responsive for fast field discharge upon shut off of the over-voltage protection switch.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

As used herein, the term "fast" when referring to a "fast discharge" or "fast dissipation" refers to a discharge or dissipation occurring within about 0.5 to about 5 ms, typically about 1.5 ms.

Most AC power systems are based on AC generators which are controlled to maintain their point of regulation voltage constant. The point of regulation voltage regulation is achieved by adjusting the field current with the use of switching mode regulator such as buck switch to compensate for load and speed variations. Over-voltages may occur in the generator output, for instance, in case of disconnection of the battery while the engine and generator are running. Sometimes the over-voltage may occur due to intermittent rotating diode rectifier or loose contacts. The existing control circuits terminate the field excitation to the generator when an over-voltage condition is sensed by the normal voltage regulating system. The traditional over-voltage protection switch associated with these circuits stops the buck switch and allows the field current decay through a fly-wheeling diode connected across the field coil.

Figure 1:
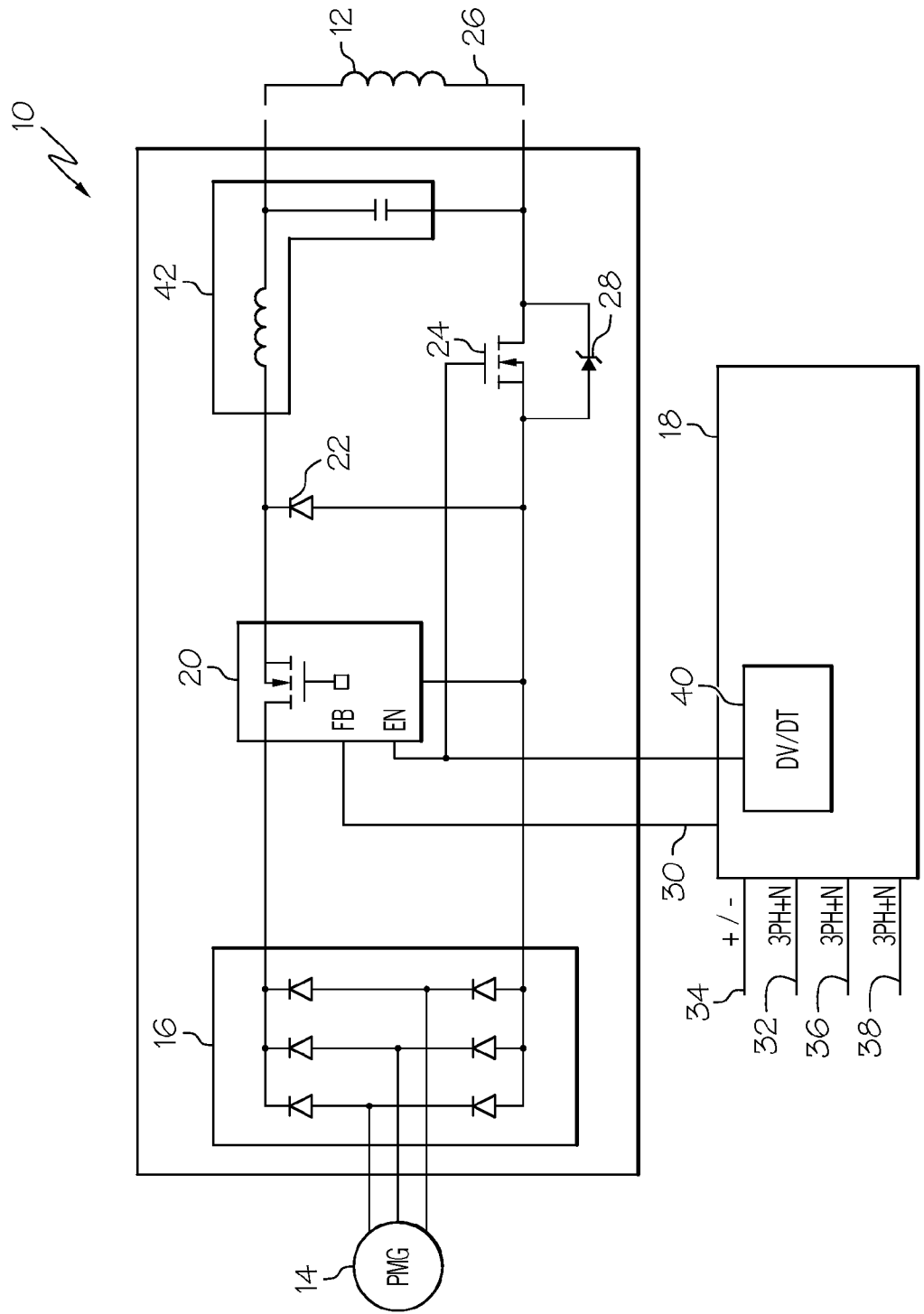
FIG. 1 is a circuit of the present invention for fast field discharge.

Referring the FIG. 1, the present invention generally provides a circuit configuration of a generator control unit 10 for fast dissipation of field energy of a field coil 12 of a generator in an over-voltage condition. The generator control unit 10 may include a control domain 18 for detecting an excessive output voltage of the generator, and a buck regulator 20 with an external fly-wheeling diode 22. The control unit 10 may further have an over-voltage protection switch 24 connected in the field coil return path 26, and a voltage limiting device 28 across the over-voltage protection switch 24. The over-voltage protection switch 24 may be connected to a buck enable signal EN and kept on whenever the buck regulator 20 is enabled under normal conditions. The control domain 18 may receive a point of regulation voltage feedback 32 from an output of the generator for comparison with an internal reference voltage, representing the desired POR level. The result of this comparison in an error signal 30, representing the deviation of the POR voltage from the desired level. Error signal 30 is passed to the Buck regulator FB pin for duty cycle adjustment. When the error signal 30 exceeds a higher level, representing the Over-Voltage detection limit—the control domain 18 will disable the Buck regulator 20 (shutting its switch Off) along with the over-voltage protection switch 24. Thus dual breaking points may be created by the Buck switch breaking the High side and the OV protection switch breaking the low side of the field coil loop. Moreover, the over-voltage protection switch 24 may function as a directly controlled switch by providing a second breaking point to protect against the effect of a shorting failure of the buck regulator 20 by discharging the field charge through the voltage limiting device 28 and allowing higher voltage across the field coil 12. This is unlike the prior art which fails to control field dissipation with a single, directly controlled switch and protect against the effect of a shorting failure of the buck regulator 20.

The field coil 12 may be powered from a permanent magnet generator 14 through a rectifier bridge 16. The control domain 18 may include a high voltage detector 40 and may receive a plurality of control signals from the output of the generator which control signals include feeder current feedback 38, generator current feedback 36, point of regulation voltage feedback 32, and control power feedback 34. The control domain 18 may compare a point of regulation voltage with a reference voltage and may produce a DC error signal to be passed on to the buck regulator 20 in an isolated domain through an opto-coupler which operates in continuous mode. In normal conditions, the buck regulator 20 in the isolated domain may adjust its duty cycle based on a comparison of its internal reference with a voltage received on the feedback pin FB.

The over-voltage protection switch 24 may be set to be controlled directly from the buck enable pin EN. The high voltage rating of the voltage limiting device 28 may make fast field discharge and it may maintain a safe voltage level across the over-voltage protection switch 24 and field coil 12.

The over-voltage protection switch 24 may be a metal oxide semiconductor field effect transistor and voltage limiting device 28 may be a transorb. The control unit 10 may be provided with an additional inductance-capacitance filter 42 to reduce electro magnetic interference impact of field wires of the field coil 12.

Figure 2:
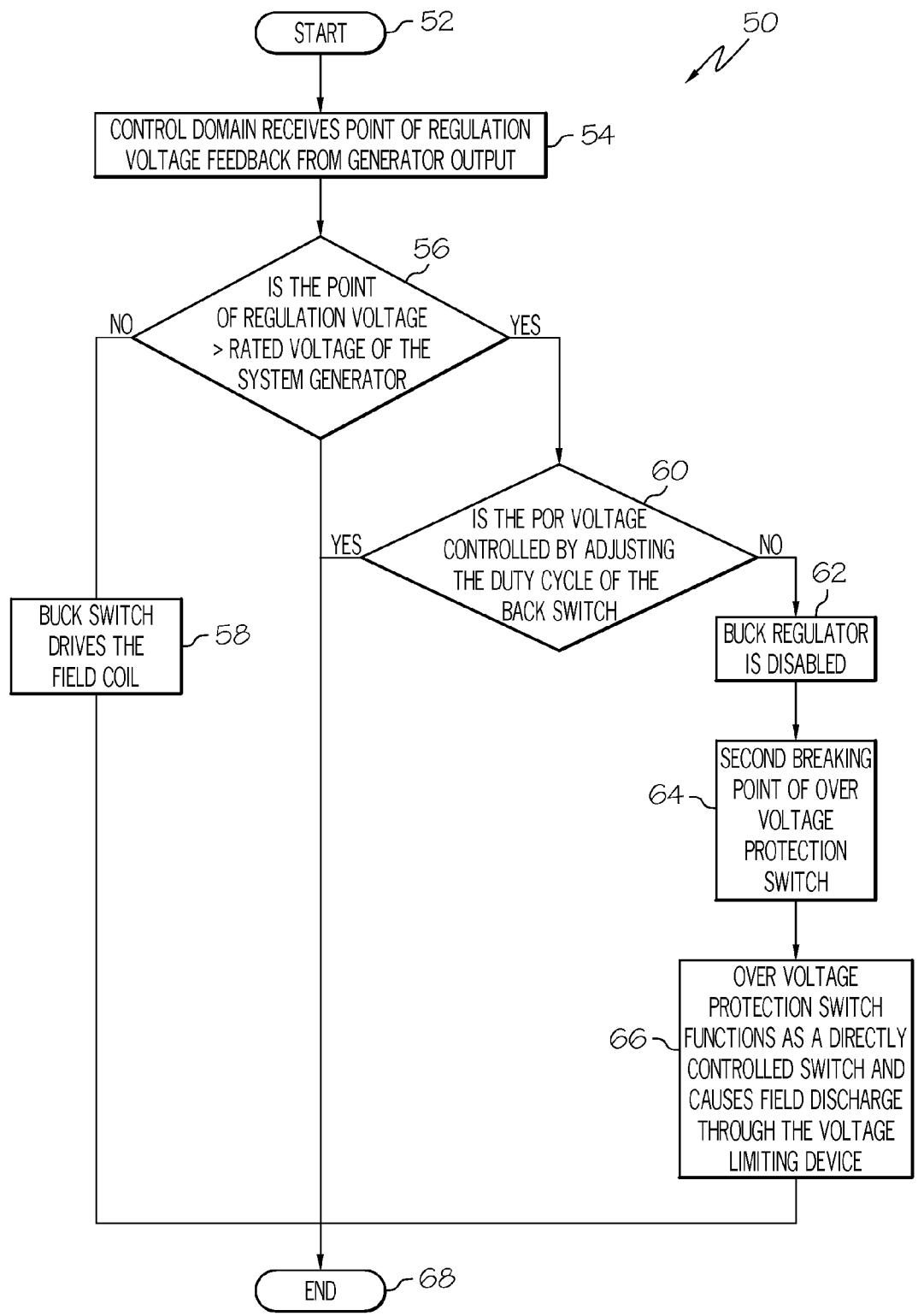
FIG. 2 is a flowchart showing the working of generator control unit.
Figure 3:
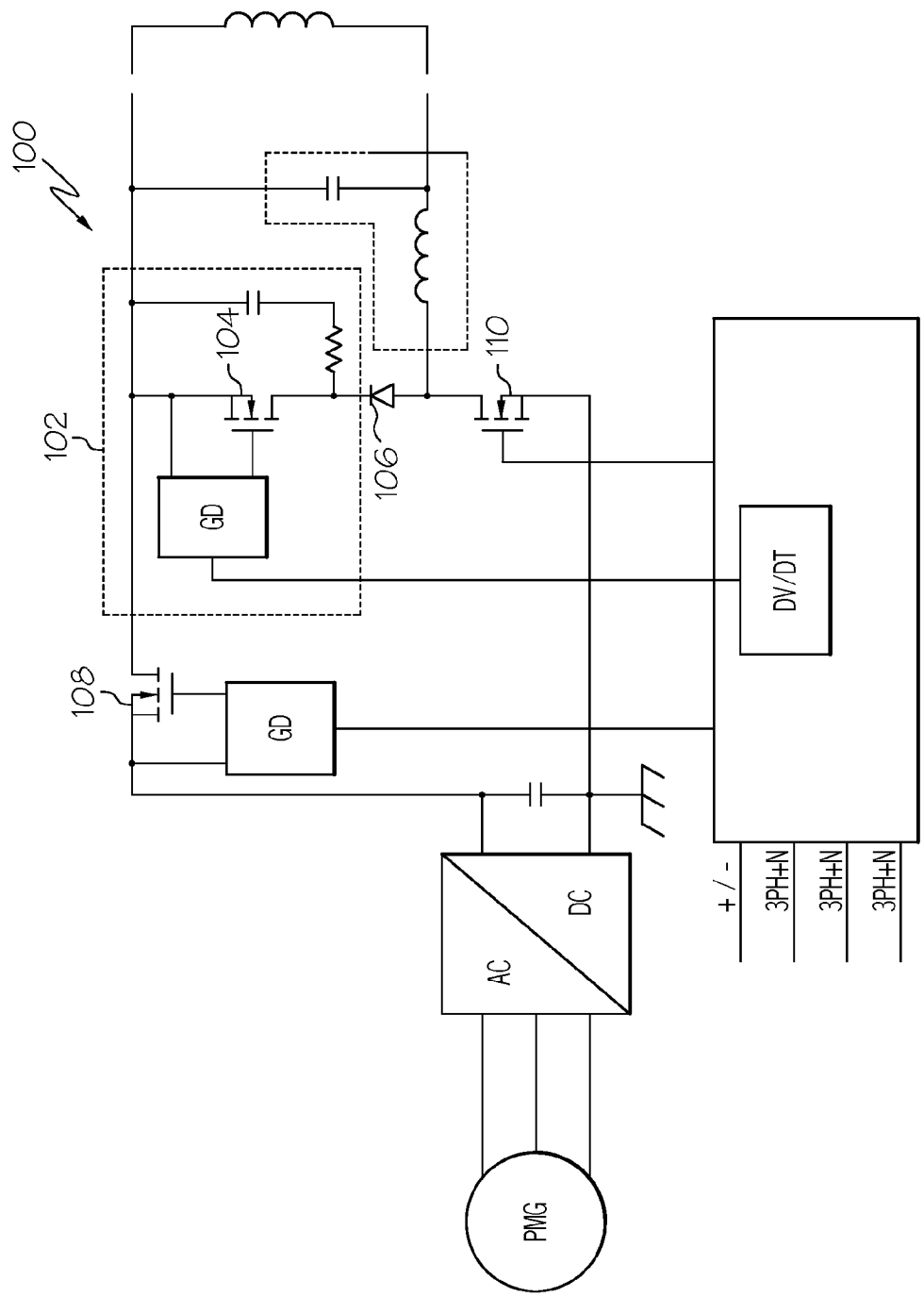
FIG. 3 is a circuit of a known prior art for fast discharge of the field.
Figure 4:
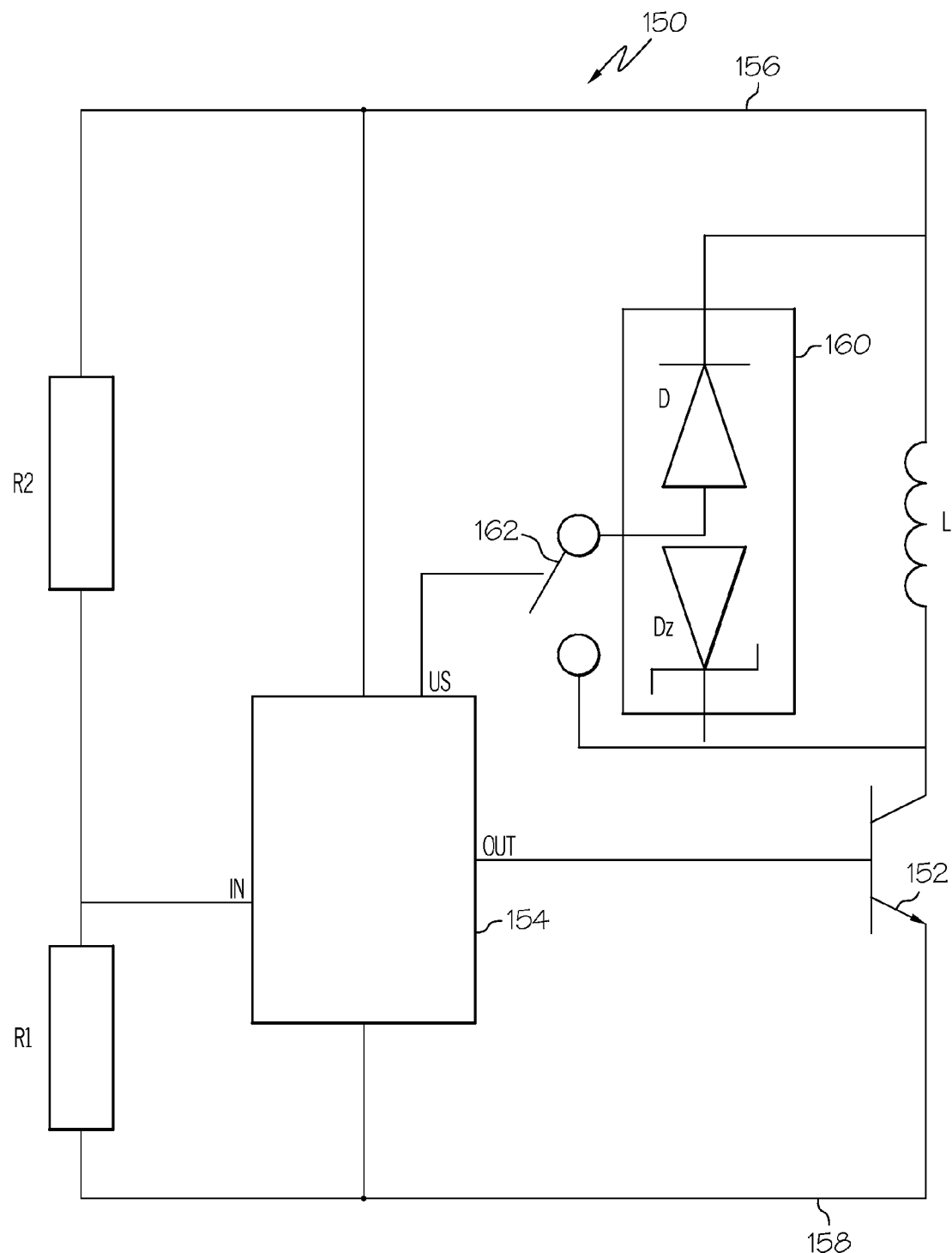
FIG. 4 is another circuit of a known prior art for fast discharge of the field.
Figure 5:
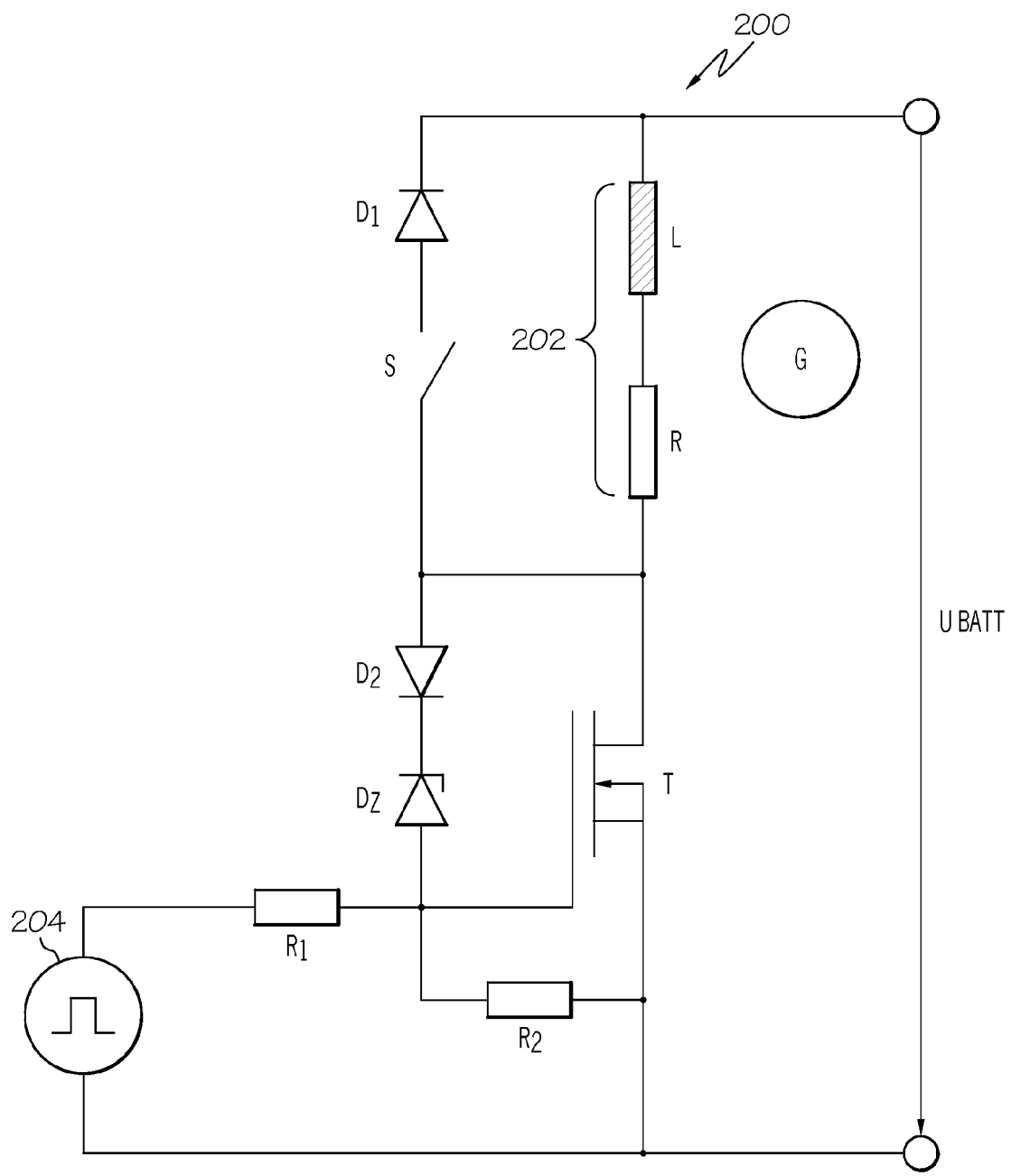
FIG. 5 is still another circuit of a known prior art for fast discharge of the field.

Referring to FIG. 2, a flow chart 50 of operations depicting logical operational steps for discharging the field energy is illustrated, in accordance with present invention. The process depicted in FIG. 2 can be initiated, as indicated at block 52. Thereafter, as depicted at block 54, a control domain may receive a point of regulation voltage from the output of the generator. A high voltage detector in the control domain may check whether the point of regulation voltage exceeds the rated voltage of the generator, as shown in block 56. Next, as depicted at block 58, if the point of regulation voltage is less than system voltage, then the buck switch may continue to regulate the field coil. Thereafter, as indicated at block 60, if the POR voltage cannot be controlled by adjusting the duty cycle of the buck switch, the buck regulator 20 may be disabled, as shown in block 62, and the second breaking point of the over-voltage protection switch may occur as indicated at block 64. Then the over-voltage protection switch may function as a directly controlled switch and may make the field discharge through a voltage limiting device, as shown in block 66. The process can then terminate, as illustrated at block 68.

An exemplary control circuit can have other voltage limiting devices such as varistors, resistor-capacitors (RC), or resistor-capacitor-diode (RCD) networks across the over-voltage protection switch. Another exemplary control circuit may have a synchronous buck switch instead of buck switch with external fly-wheeling diode.

It should be understood, of course, that the foregoing relates to exemplary embodiments of the invention and that modifications may be made without departing from the spirit and scope of the invention as set forth in the following claims.

I claim:

1. A generator control unit for discharge of field energy of a field coil, comprising:
    a control domain detecting an excessive output voltage of a generator connected thereto;
    a buck regulator driving the field coil of the generator with an external fly-wheeling diode, the buck regulator having a feedback pin fed from the control domain;
    an over-voltage protection switch connected in the field coil return path, the over-voltage protection switch shutting off along with the buck switch when an over-voltage is detected by the control domain to create dual breaking points at two terminals of the field coil, wherein the over-voltage protection switch functions as a directly controlled switch by providing a second breaking point to protect against a buck switch shorting failure condition; and a voltage limiting device across the over-voltage protection switch responsive for a fast field discharge upon shut off of the over-voltage protection switch.

2. The generator control unit of claim 1, wherein the control domain includes a high voltage detector and receives a plurality of control signals from an output of the generator, which control signals include feeder current feedback, generator current feedback, point of regulation voltage feedback, and control power feedback.

3. The generator control unit of claim 1, wherein the control domain compares a point of regulation voltage with a reference voltage and produces a DC error signal to be passed on to the buck switch in an isolated domain through an opto-coupler.

4. The generator control unit of claim 3, wherein the opto-coupler operates in continuous mode.

5. The generator control unit of claim 3, wherein the buck switch in the isolated domain adjusts its duty cycle based on a comparison of its internal reference with a voltage received on the feedback pin.

6. The generator control unit of claim 1, wherein the over-voltage protection switch is arranged to be controlled directly from a buck enable pin.

7. The generator control unit of claim 1, wherein under normal conditions, the over-voltage protection switch is kept on whenever the buck switch is enabled.

8. The generator control unit of claim 1, wherein the over-voltage protection switch is a metal oxide semiconductor field effect transistor.

9. The generator control unit of claim 1, wherein the rating of the voltage limiting device is high enough to cause fast field discharge and to maintain a safe voltage level across the over-voltage protection switch and field coil.

10. The generator control unit of claim 1, wherein the voltage limiting device is a transorb.

11. The generator control unit of claim 1, wherein an inductance—capacitance filter may be included to the generator control unit to reduce electro magnetic interference impact of field wires of the field coil.

12. A method for discharge of field energy of a field coil of a generator, the method comprising:
    detecting an over-voltage at an output of the generator by a control domain;
    disabling a buck regulator, shutting its switch Off, along with an over-voltage protection switch;
    dissipating a field charge through a voltage limiting device; and
    allowing the field charge to discharge through the voltage limiting device by providing a second breaking point when the buck regulator experiences a shorting failure, thereby controlling the field discharge with directly controlled over-voltage protection switch.

13. The method of claim 12, wherein the control domain includes a high voltage detector and receives a plurality of control signals from an output of the generator, which control signals include feeder current feedback, generator current feedback, point of regulation voltage feedback, and control power feedback.

14. The method of claim 12, wherein the control domain compares a point of regulation voltage with a reference voltage and produces a DC error signal to be passed on to the buck regulator in an isolated domain through an opto-coupler.

15. The method of claim 12, wherein the over-voltage protection switch is arranged to be controlled directly from a buck enable pin.

16. The method of claim 12, wherein under normal conditions, the over-voltage protection switch is kept on whenever the buck regulator is enabled.

17. The method of claim 12, wherein the over-voltage protection switch is a metal oxide semiconductor field effect transistor.

18. The method of claim 12, wherein a rating of the voltage limiting device is high enough to cause fast field discharge and to maintain a safe voltage level across the over-voltage protection switch and field coil.

19. The method of claim 12, wherein an inductance-capacitance filter may be included to the control unit to reduce electro magnetic interference impact of field wires of the field coil.

20. An apparatus for discharge of field energy of a field coil of a generator, comprising:
    a control domain for detecting an excessive output voltage of the generator connected thereto;
    a buck regulator for driving the field coil of the generator with an external fly-wheeling diode, the regulator having a feedback pin fed from the control domain;
    an over-voltage protection switch connected in the field coil return path, the over-voltage protection switch shuts off along with the buck switch when an over-voltage is sensed by the control domain to create dual breaking points at two terminals of the field coil, and the over-voltage protection switch functioning as a directly controlled switch by providing a second breaking point to protect against a buck switch shorting failure condition; and
    a voltage limiting device across the over-voltage protection switch responsive for fast field discharge upon shut off of the over-voltage protection switch.

* * * * *